UNITED STATES PATENT OFFICE.

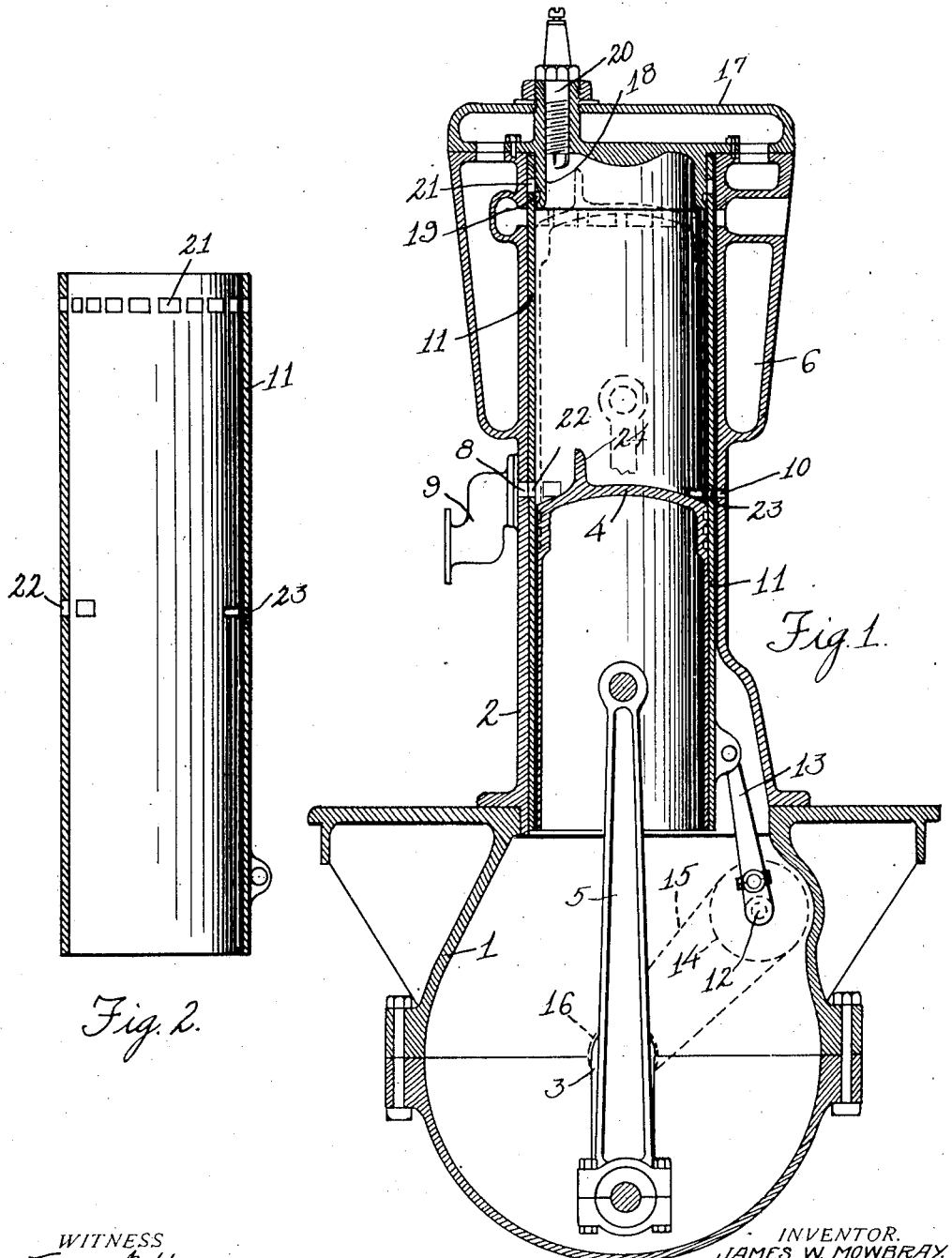

JAMES W. MOWBRAY, OF WINDSOR, ONTARIO, CANADA, ASSIGNOR, BY DIRECT AND MESNE ASSIGNMENTS, OF TWO-THIRDS TO DAVID A. STEWART, OF LISTOWEL, ONTARIO, CANADA, AND ONE-THIRD TO JACOB C. SIEMON, OF TORONTO, ONTARIO, CANADA.

INTERNAL-COMBUSTION ENGINE.

1,356,730. Specification of Letters Patent. Patented Oct. 26, 1920.

Application filed October 4, 1916. Serial No. 123,635.

*To all whom it may concern:*

Be it known that I, JAMES W. MOWBRAY, a subject of the King of Great Britain, residing at Windsor, county of Essex, Province of Ontario, Canada, have invented a certain new and useful Improvement in Internal-Combustion Engines, and declare the following to be a full, clear and exact description of the same, such as will enable others skilled in the art to which it pertains to make and use the same, reference being had to the accompanying drawings, which form a part of this specification.

This invention relates to internal combustion engines and its object is an engine of the four-cycle or stroke type utilizing a sleeve valve operating in conjunction with the piston to control the intake and exhaust ports of the explosion chamber whereby a simplicity of construction is attained and consequent reduction in the liability of disarrangement of the relationship of the several parts. A further object is an engine of the character stated in which air is introduced during the introduction of the explosive charge, the oxygen of which assists in the combustion in the explosion chamber preventing carbon deposit. Another object is an engine of the character stated having a sleeve valve controlling the exhaust port and operating in conjunction with the piston to control the fuel and air intake ports preferably in a manner to introduce the air subsequent to the introduction of the fuel charge and segregating a part of the fuel charge in its original state and igniting the same to ignite the remaining charge within the chamber. A further object of the invention is a four stroke internal combustion engine in which the fuel charge is introduced by a vacuum released to the intake conduit near the bottom of the intake stroke of the piston. These and the other objects and the several novel features of the invention in its preferred form are hereinafter more fully described and claimed and shown in the accompanying drawings in which—

Figure 1 is a vertical cross section of an internal combustion engine embodying my invention.

Fig. 2 is a vertical section of a sleeve utilized in controlling the ports of the cylinder.

Similar characters refer to similar parts throughout the drawing and specification.

The engine is provided with the usual crank case 1 on which is mounted a cylinder 2. A crank 3 of ordinary form is provided connected with the piston 4 by means of the usual connecting rod 5. The cylinder is provided with a water jacket 6 near the upper end after the usual method and an exhaust port 7 is provided preferably encircling the upper end of the cylinder to provide a port of large area. The cylinder is also provided with a fuel intake port 8 intermediate its length connected with which is the usual intake manifold 9. On the opposite side from the fuel intake port 8, the cylinder is provided with a port 10 open to atmosphere.

Reciprocable within the cylinder and riding in close contact with the inner wall thereof is a cylindrical sleeve member 11 extending practically the full length of the cylinder, the sleeve is reciprocable therein by means of a crank 12 and connecting rod 13 and the crank is provided with a gear 14 connected by a chain 15 with a gear 16 on the crank shaft 3. The gears 16 and 14 are in the proportion of one to two so that during two revolution of the crank shaft 3, the crank shaft 12 makes one complete revolution.

The head 17 of the cylinder proper is preferably separable therefrom, as indicated and is provided with a cylindrical portion 18 extending into the upper end of the cylinder and spaced from the wall thereof to receive the end of the sleeve 11, as indicated in Fig. 1. The portion 18 is preferably provided with a packing ring 19 and the head is also provided with an extension leading through the wall of the encircling jacket to receive the spark plug 20 as indicated, the plug being located preferably directly above the intake port.

The sleeve at the upper end is provided with an exhaust port 21 corresponding with the exhaust port 7 of the cylinder and is also provided with an intake port 22 corresponding with the intake port of the cylinder and intake port 23 corresponding to that of the cylinder, as will be noted in Fig. 1. The porting of the sleeve is such that when the fuel and air intake ports are open the exhaust port is closed and vice versa, the sleeve being thus ported to register alternately with the exhaust port and the fuel and intake ports during its recuperation. It is to be further noted that while the exhaust port is controlled solely by the sleeve to open and close the same, the flow of fuel into the explosion chamber is controlled by the piston acting as a valve in conjunction with the sleeve. That is—the ports 22 and 8 may be brought to registration before the piston in its movement has uncovered the port 22. This is also true as to the ports 23 and 10.

The head of the piston is provided with a baffle 24 which is positioned proportionately nearer the intake side of the cylinder. I am aware that it is common practice to use a baffle on the head of the piston in engines of the two-cycle type to prevent a flow of gas from the intake port across the piston to the exhaust port. In such case the purpose of the baffle is to deflect the intake charge toward the upper part of the explosion chamber. The purpose and result of use of the baffle in the construction here shown differs materially from that of the two-cycle type mentioned in that, at the time of fuel intake, the vacuum resulting from the complete downward stroke of the piston is released to the intake and also to the air intake on the opposite side of the piston from the fuel intake. The position of the fuel and air intake ports respectively being such that the fuel intake port is first opened by movement of the piston and subsequently the air intake port, the intake manifold is subjected first to the full vacuum produced and, as the vacuum becomes reduced by inflow of fuel but prior to the satisfaction of vacuum created in the chamber, the air intake port is then opened. The baffle is between the two ports 22 and 23 and really provides a pocket about the fuel intake port in which the introduced fuel charge is undiluted by flow of air into the cylinder through the port 23. On the upward stroke of the piston to the position indicated by dotted lines in Fig. 1, this undiluted charge between the baffle and face of the surrounding sleeve is brought contiguous to the spark plug and is fired. The firing of this rich mixture fires the entire charge. Preferably the engine is operated to provide a fuel charge that is readily ignitible and not too "lean" or too "rich." As will be understood, the introduction of air through the intake port 23 tends to "lean" the mixture in the cylinder and if the entire charge were so "leaned" or weakened, it would not continuously ignite properly. By providing a pocket or space in which mixture of the proper proportions is retained the firing of the segregated charge fires the entire charge. By such arrangement it is possible to fire a charge with an over-percentage of oxygen which supports the combustion in the chamber and prevents carbon deposits therein. This method also results in economy in use of fuel.

The operation of the engine is as follows: Let it be supposed that the charge is introduced into the cylinder in the position shown in full lines in Fig. 1. The exhaust port being closed by the sleeve, the upward stroke of the piston compresses the charge and on arrival at the upper end of the stroke the charge is fired by first igniting the segregated charge by the spark plug. The piston then moves downward on the power stroke and just before it reaches the bottom of the stroke the sleeve has moved to open the exhaust port and close the intake port 8 leading to the intake manifold so that as the piston reaches the bottom of its stroke the intake port is closed by the sleeve and the exhaust port opened thereby. The air intake port is also closed at this period. The next upward stroke of the piston sweeps the burned gases of the cylinder through the exhaust port. As the piston reaches the upper point of its exhaust stroke the exhaust port is again closed by the sleeve and the piston starts downward on the intake stroke. The sleeve is moved to open the intake port 8 prior to the piston reaching the bottom of its stroke. Thus, as the piston moves downward, a vacuum is produced in the explosion chamber released to the intake manifold when the greatest possible vacuum has been produced by the stroke thus introducing the fuel and air charge. The operation is continued by the succeeding compression stroke as above described. So far as the four-stroke sleeve valve motor is concerned the air intake port is not essential, as the engine is operable without such air intake, the parts performing all of the functions stated, but I prefer to use an auxiliary air intake to provide oxygen to support the combustion in the explosion chamber as heretofore stated in order to provide an engine economical in the use of fuel and practically free from carbon deposits within the cylinder or smoke in the exhaust gases. With the use of the sleeve and crank 12 for operation thereof in relation of one to two with that of the piston the usual puppet valves and the multiplicity of parts required in the operation thereof including a cam shaft and timing of the cams is entirely dispensed with resulting in an engine that is more perfect in operation and less liable to get out of order and also less noisy in operation, as will be understood by those familiar with the art. While I have shown an engine of a particular design embodying my invention it is to be understood that various designs may be utilized within the scope of the appended claims.

Having thus briefly described my invention, its utility and mode of operation, what I claim and desire to secure by Letters Patent of the United States is—

1. In an internal combustion engine, a cylinder having an exhaust port near the upper end, a fuel intake port intermediate its length and an air intake port, a single sleeve reciprocable within the cylinder ported to register alternately with the exhaust port and the fuel and air intake ports of the cylinder, the fuel and air intake ports of the sleeve and the cylinder being simultaneously in registration and controlled solely by the piston and the introduction of fuel and air being caused solely by reduction of pressure within the cylinder, the said fuel and air ports being so positioned that the air intake port of the sleeve is opened subsequent to the fuel intake and closed prior to the closing of the fuel intake, the reciprocable movement of the sleeve and piston being in the relation of one to two.

2. In an internal combustion engine, a cylinder having an exhaust port near the upper end, a fuel intake port intermediate its length and an air intake port opposite the fuel intake port, a cylindrical sleeve reciprocable within the cylinder and ported to register alternately with the exhaust port and the fuel and air intake ports, a piston reciprocable within the sleeve controlling the fuel and air intake ports, the two ports being so positioned that the air intake port is opened subsequent to the fuel intake port, the reciprocal movement of the sleeve and piston being in proportion of one to two.

3. In an internal combustion engine, a cylinder having an exhaust port near the upper end, a fuel intake port intermediate its length, and an air intake port substantially opposite the fuel intake port, a cylindrical sleeve reciprocable within the cylinder and ported to register alternately with the exhaust port and with the fuel and air intake ports, a piston reciprocable within the sleeve controlling the fuel and air intake ports, the two ports being so positioned that the air intake port is open subsequent to the fuel intake port, said piston having a wall separating the flow through the two ports into the cylinder, the reciprocation of the sleeve and piston being in the proportion of one to two.

4. In an internal combustion engine, a cylinder having an exhaust port near the upper end constituting the sole exhaust for the cylinder, a fuel intake port intermediate the length of the cylinder and an air intake port on the side opposite the fuel intake port, a cylindrical sleeve reciprocable within the cylinder, a sleeve ported to register alternately with the exhaust port and the fuel and air intake ports of the cylinder, the fuel and air intake ports of the sleeve being registrable simultaneously with the similar ports of the cylinder, a piston reciprocable within the sleeve, movement of the piston opening and closing the fuel and air intake ports of the sleeve, the ports being so positioned that the air intake port is opened subsequent to the fuel intake port and closed prior to the closing of the fuel intake port, and means for reciprocating the sleeve and piston in the relation of one to two.

In testimony whereof, I sign this specification.

JAMES W. MOWBRAY.